United States Patent
Ren (10) Patent No.: US 10,928,685 B1
(45) Date of Patent: Feb. 23, 2021

(54) MANUFACTURING METHOD FOR ITO COMMON ELECTRODE ON CF SUBSTRATE SIDE

(71) Applicant: Shenzhen China Star Optoelectronics Semiconductor Display Technology Co., Ltd., Shenzhen (CN)

(72) Inventor: Wei Ren, Shenzhen (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 341 days.

(21) Appl. No.: 16/307,468

(22) PCT Filed: Sep. 19, 2018

(86) PCT No.: PCT/CN2018/106574
§ 371 (c)(1),
(2) Date: Dec. 5, 2018

(87) PCT Pub. No.: WO2019/242134
PCT Pub. Date: Dec. 26, 2019

(30) Foreign Application Priority Data

Jun. 20, 2018 (CN) .......................... 20181063871.6

(51) Int. Cl.
*H01L 29/04* (2006.01)
*G02F 1/1343* (2006.01)
*G02F 1/1368* (2006.01)

(52) U.S. Cl.
CPC ...... *G02F 1/134309* (2013.01); *G02F 1/1368* (2013.01); *G02F 1/13439* (2013.01)

(58) Field of Classification Search
CPC ............. G02F 1/134309; G02F 1/1368; G02F 1/13439
See application file for complete search history.

(56) References Cited

U.S. PATENT DOCUMENTS 5,400,157 A * 3/1995 Won ...................... G02F 1/1345
349/152
5,610,740 A * 3/1997 Kamamori .......... G02F 1/13439
349/110

(Continued)

FOREIGN PATENT DOCUMENTS

CN 102681269 A 9/2012
CN 202430282 U 9/2012

(Continued)

*Primary Examiner* — Caleb E Henry
(74) *Attorney, Agent, or Firm* — Leong C. Lei (57) ABSTRACT

The manufacturing method for ITO common electrode on CF substrate side of the present invention, after diving entire surface of the ITO film into multiple ITO blocks, performing a laser cutting again along the uniform film thickness portion at the periphery of the entire surface of the ITO film, and a laser cutting path at the uniform film thickness portion at the periphery of the entire surface of the ITO film form a closed pattern such that the connection of each ITO block at the uneven thickness portion of the periphery of the entire surface of the ITO film can be completely cut off, and the multiple ITO blocks located in the closed pattern constitute the ITO common electrode on the CF substrate side, thereby the insulation between the multiple ITO blocks is improved, ensuring that different ITO blocks can independently inputted with different Curing signals without affecting each other.

9 Claims, 6 Drawing Sheets

(56) References Cited

U.S. PATENT DOCUMENTS

| | | | | |
|---|---|---|---|---|
| 6,325,902 | B1* | 12/2001 | Shishido | C23C 14/042 |
| | | | | 204/192.26 |
| 6,342,970 | B1* | 1/2002 | Sperger | G02B 5/201 |
| | | | | 348/273 |
| 6,930,740 | B2* | 8/2005 | Yoon | G02F 1/133371 |
| | | | | 349/106 |
| 2004/0227885 | A1* | 11/2004 | Kiyota | G02F 1/133514 |
| | | | | 349/139 |
| 2004/0266307 | A1* | 12/2004 | McCoy | G02F 1/133516 |
| | | | | 445/24 |
| 2005/0243248 | A1* | 11/2005 | Yoon | G02F 1/133707 |
| | | | | 349/106 |
| 2006/0007365 | A1* | 1/2006 | Um | G02F 1/133707 |
| | | | | 349/36 |
| 2012/0162104 | A1* | 6/2012 | Chang | G02F 1/133514 |
| | | | | 345/173 |
| 2013/0142947 | A1* | 6/2013 | Wu | G02F 1/133516 |
| | | | | 427/162 |
| 2013/0293818 | A1* | 11/2013 | Murata | G02F 1/134363 |
| | | | | 349/141 |
| 2014/0028616 | A1* | 1/2014 | Furutani | G09G 3/3648 |
| | | | | 345/174 |
| 2019/0086704 | A1* | 3/2019 | Lv | G02F 1/13338 |
| 2019/0204690 | A1* | 7/2019 | Liu | G02F 1/133516 |

FOREIGN PATENT DOCUMENTS

| | | |
|---|---|---|
| CN | 106293186 A | 1/2017 |
| CN | 106547155 A | 3/2017 |
| CN | 107043915 A | 8/2017 |
| JP | 2008145577 A | 6/2008 |

\* cited by examiner

MANUFACTURING METHOD FOR ITO COMMON ELECTRODE ON CF SUBSTRATE SIDE

FIELD OF THE INVENTION

The present invention relates a display device manufacturing field, and more particularly to a manufacturing method for ITO common electrode on CF substrate side.

BACKGROUND OF THE INVENTION

Currently, liquid crystal displays (LCDs) dominate the field of flat panel displays.

Most of the LCDs on the market are backlight type liquid crystal display devices, which include a case, a liquid crystal panel disposed in the case, and a backlight module disposed in the case. The liquid crystal panel is formed by a color filter substrate (CF), a thin-film transistor array substrate, and a liquid crystal layer disposed between the two substrates. The working principle is to control the rotation of the liquid crystal molecules of the liquid crystal layer by applying a driving voltage on the two glass substrates, and refract the light of the backlight module to generate an image.

Figure 1:
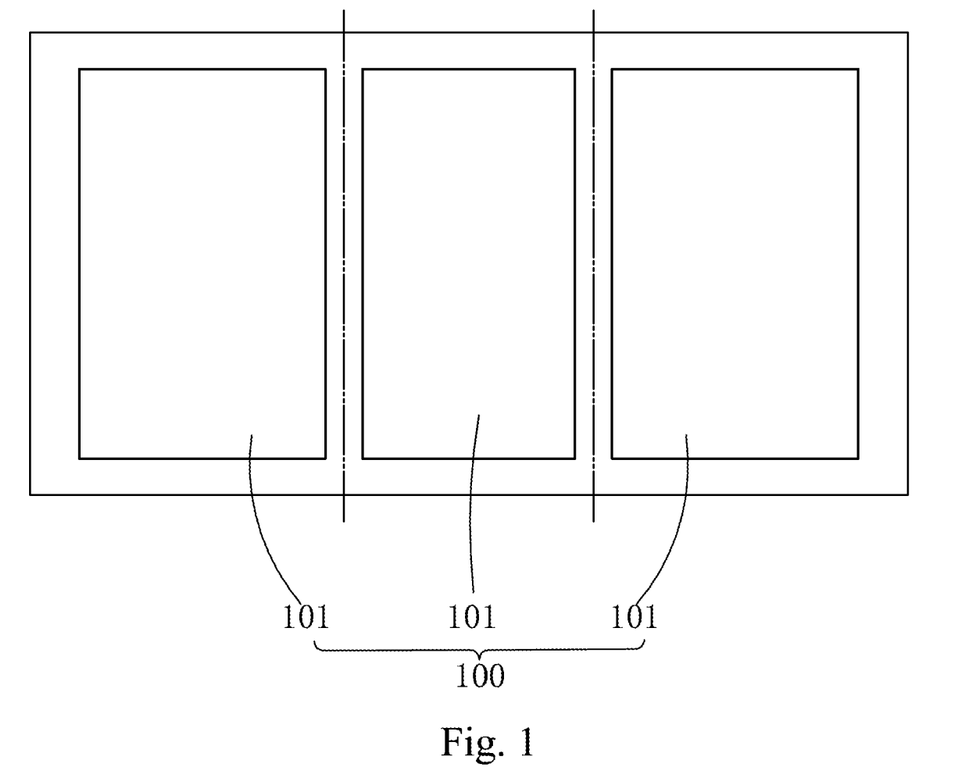
FIG. 1 is a schematic plan view of ITO common electrode on CF substrate side in the conventional art.

Wherein, a common electrode made of an ITO film is deposed on the CF substrate side. The ITO film, that is, a tin-doped indium tin oxide film, has high electrical conductivity, high visible light transmittance, high mechanical hardness, and good chemical stability. Referring to FIG. 1, in the process of liquid crystal alignment and forming a pre-tilt angle of liquid crystal molecules, different electrical signals need to be inputted to different regions of the ITO common electrode on the CF substrate side (referred to as Curing signal in the industry), so that the ITO common electrode 100 at the CF substrate side is divided into multiple insulated ITO blocks 101 (the shape of each ITO block 101 is usually a simple rectangle), so that different ITO blocks 101 can independently access different Curing signals without affecting each other.

Figure 2:
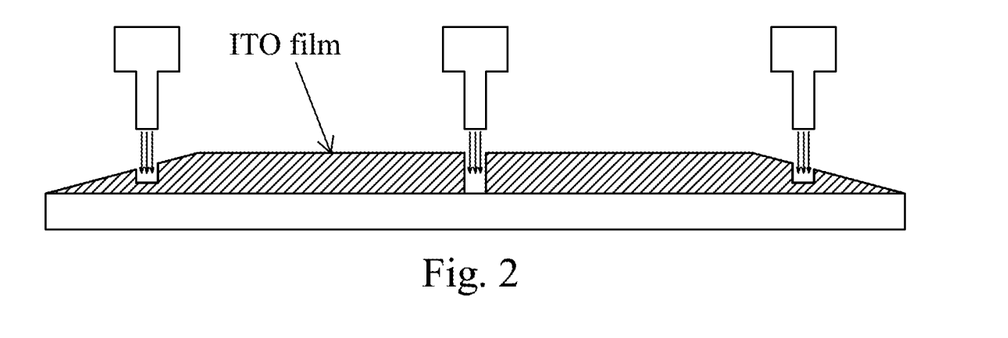
FIG. 2 is a schematic cross-sectional view of state of an ITO film having uneven film thickness when cutting by a laser at different positions.
Figure 3:
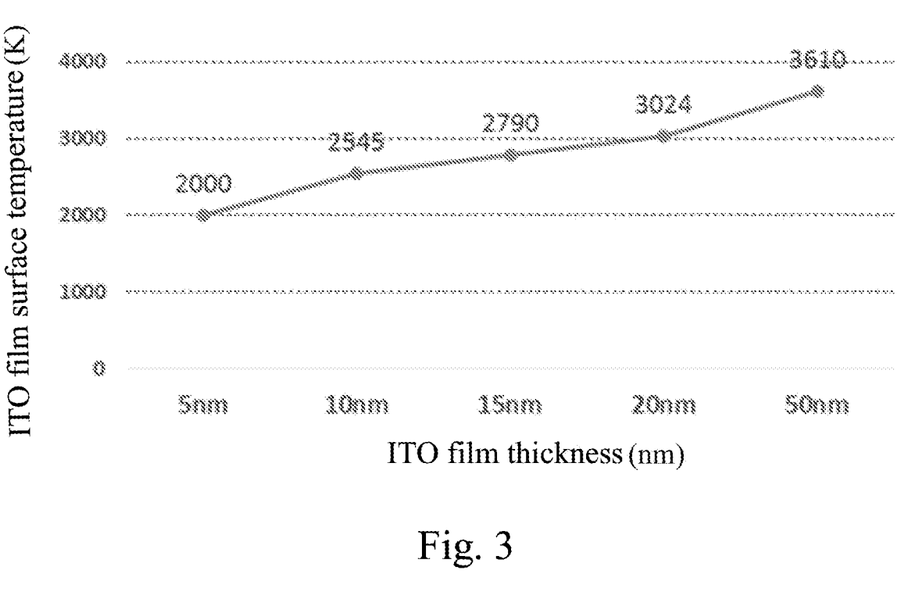
FIG. 3 is schematic diagram of a relationship between the film thickness and the surface temperature of the ITO film when laser cutting.

At present, in the field of LCD process technology, the ITO common electrode 100 at CF substrate side is generally divided into multiple ITO blocks 101 by a laser (a two-dot chain line in FIG. 1 indicates a laser cutting path). However, the existing method that uses the laser for cutting ITO has a drawback. As shown in FIG. 2 and FIG. 3, due to the uneven film thickness when the ITO is formed on the entire surface, the thickness of the ITO film located at the peripheral edge is thinner than that of the ITO film in other regions, and the thinner the ITO film is, the weaker the absorption of laser energy is. Correspondingly, the thinner thickness of the ITO film is, the lower surface temperature of the ITO film is, so that the ITO film located at the peripheral edge cannot be cut by the laser, and there is still a connection between the ITO blocks 101 in FIG. 1 such that between the ITO blocks 101, the insulation is poor. In this way, subsequent input of different Curing signals for different ITO blocks 101 will affect each other.

SUMMARY OF THE INVENTION

An object of the present invention is to provide a manufacturing method for ITO common electrode on CF substrate side, which can improve the insulation between the multiple ITO blocks constituting the ITO common electrode, and ensure that different ITO blocks can be independently inputted with different Curing signals without affecting each other.

In order to achieve the above purpose, the present invention provides a manufacturing method for ITO common electrode on CF substrate side, comprising steps of: providing a CF substrate; forming a continuous uninterrupted entire surface of ITO film on the CF substrate, wherein a peripheral edge portion of the entire surface of the ITO film includes a uniform film thickness portion and an uneven film thickness portion around a periphery of the uniform film thickness portion, the film thickness of the entire surface of the ITO film is uniform except for the peripheral edge portion; cutting the entire surface of the ITO film using a laser cutting, and the entire surface of the ITO film is divided into multiple ITO block; and performing a laser cutting again along the uniform film thickness portion at the peripheral edge portion of the entire surface of the ITO film such that a laser cutting path at the uniform film thickness portion at the peripheral edge portion of the entire surface of the ITO film form a closed pattern; and multiple ITO blocks located in the closed pattern form an ITO common electrode of a side of the CF substrate.

Wherein in this step S2, a physical vapor deposition process is adopted to form the entire surface of the ITO film.

Wherein a film thickness of the entire surface of ITO film is 100 nm-150 nm.

Wherein a laser light adopted is an infrared laser light.

Wherein a wavelength band of the infrared laser light is 106 nm-780 nm.

Wherein a shape of the ITO block is a rectangle.

Wherein a closed pattern formed by the laser cutting path at the uniform film thickness portion at the peripheral edge portion of the entire surface of the ITO film is rectangular.

Wherein the infrared laser is generated by a laser cutter

Wherein different ITO blocks independently access different electric signal.

The advantageous effects of the present invention, the manufacturing method for ITO common electrode on CF substrate side of the present invention, after diving the entire surface of the ITO film into multiple ITO blocks, performing a laser cutting again along the uniform film thickness portion at the periphery of the entire surface of the ITO film, and a laser cutting path at the uniform film thickness portion at the periphery of the entire surface of the ITO film form a closed pattern such that the connection of each ITO block at the uneven thickness portion of the periphery of the entire surface of the ITO film can be completely cut off, and the multiple ITO blocks located in the closed pattern constitute the ITO common electrode on the CF substrate side, thereby the insulation between the multiple ITO blocks is improved, ensuring that different ITO blocks can independently inputted with different Curing signals without affecting each other.

BRIEF DESCRIPTION OF THE DRAWINGS

In order to further understand the features and technical contents of the present invention, please refer to the following detailed description of the invention and the accompanying drawings. The drawings are provided for purposes of illustration and description only and are not intended to be limiting.

In the drawings.

DETAILED DESCRIPTION OF PREFERRED EMBODIMENTS

In order to further clarify the technical means and effects of the present invention, the following detailed description will be made in conjunction with the preferred embodiments of the invention and the accompanying drawings.

Figure 4:
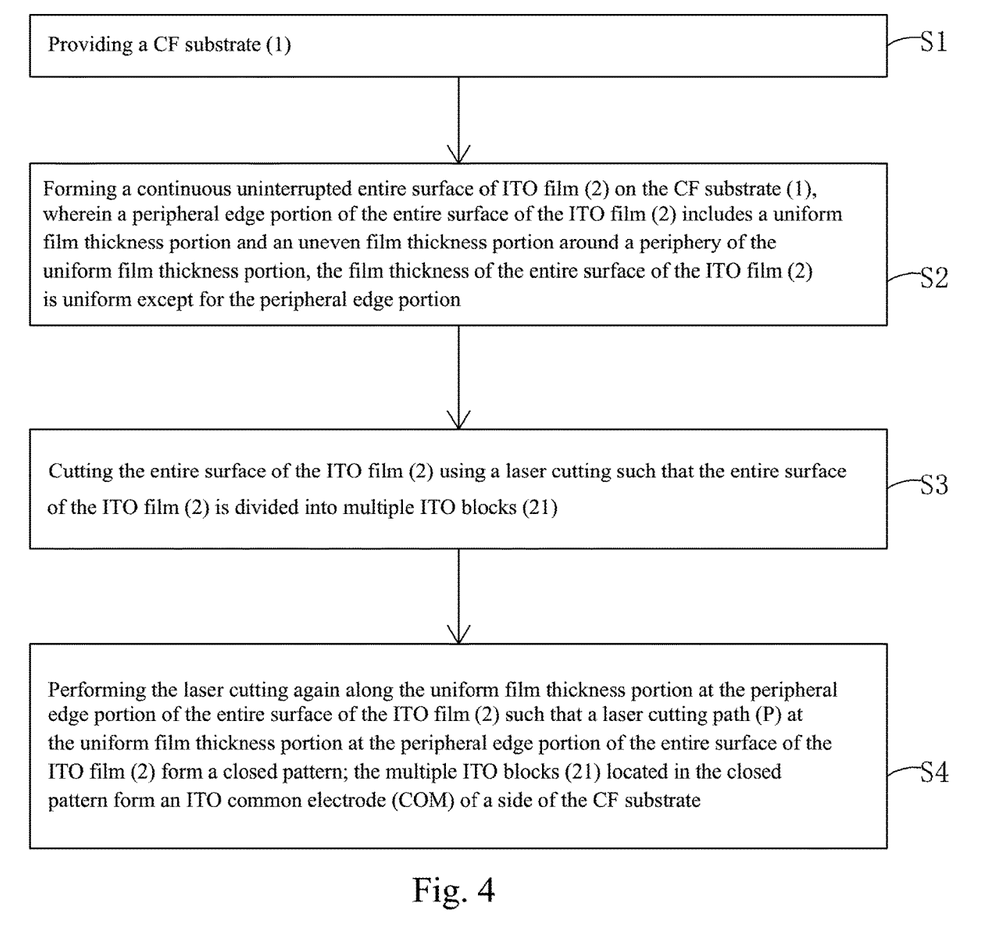
FIG. 4 is a flow chart of a manufacturing method for ITO common electrode on CF substrate side according to the present invention.

Referring to FIG. 4, the present invention provides a manufacturing method for ITO common electrode on CF substrate side, comprising the following steps:

Step S1, providing a CF substrate 1.

Figure 5:
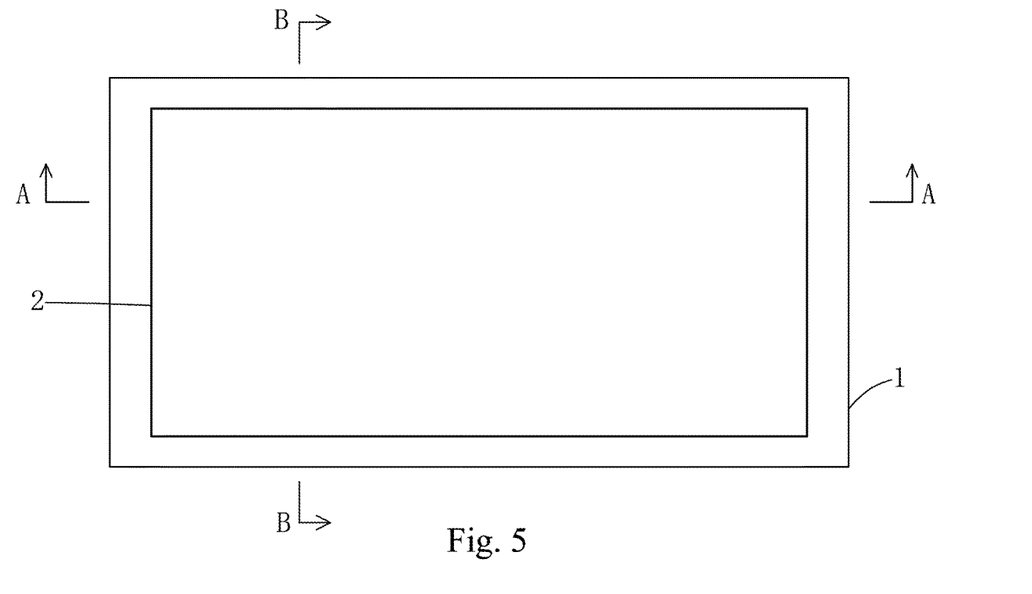
FIG. 5 is a schematic plan view of a step S2 of the manufacturing method for ITO common electrode on CF substrate side according to the present invention.
Figure 6:
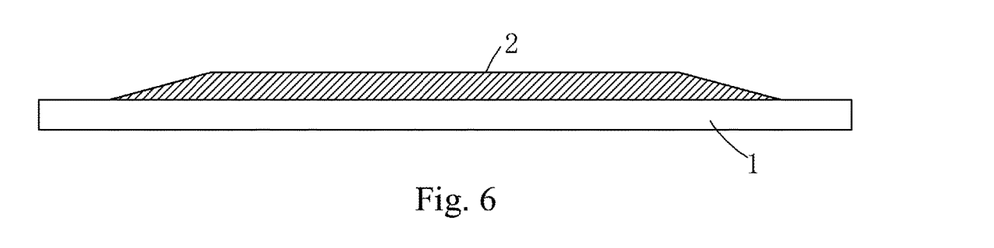
FIG. 6 is a schematic cross-sectional view corresponding to A-A in FIG. 5.
Figure 7:
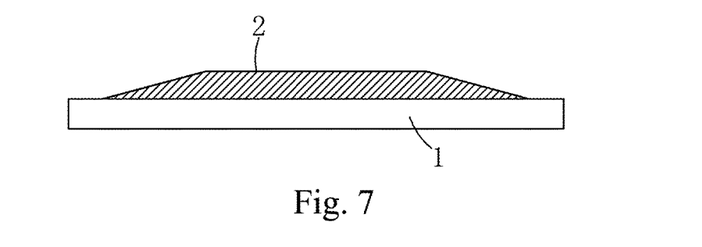
FIG. 7 is a schematic cross-sectional view corresponding to B-B in FIG. 5.

Step S2, referring to FIG. 5 to FIG. 7, forming a continuous uninterrupted entire surface of ITO film 2 on the CF substrate 1.

Specifically, in this step S2, forming the entire surface of the ITO film 2 by a physical vapor deposition (PVD) process, and a film thickness of the entire surface of ITO film 2 is 100 nm~150 nm.

As shown in FIG. 6 and FIG. 7, restricting by the vacuum coating process itself, a peripheral edge portion of the entire surface of the ITO film 2 includes a uniform film thickness portion and an uneven film thickness portion around a periphery of the uniform film thickness portion. The film thickness of the entire surface of the ITO film 2 is uniform except for the peripheral edge portion, and a thickness of the uneven film thickness portion is thinner than a thickness of the other uniform film thickness portion.

Figure 8:
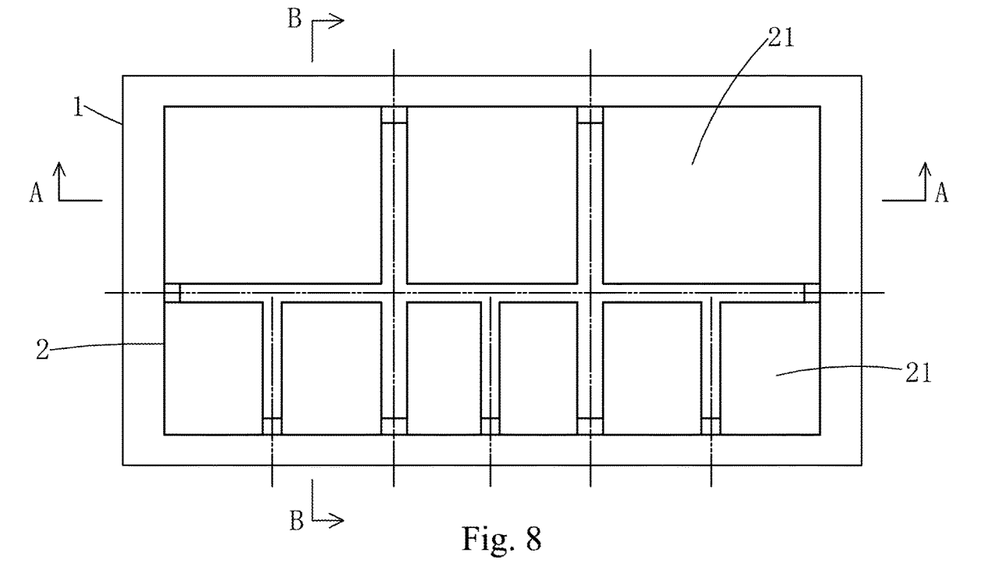
FIG. 8 is a schematic plan view of a step S3 of the manufacturing method for ITO common electrode on CF substrate side according to the present invention.
Figure 9:
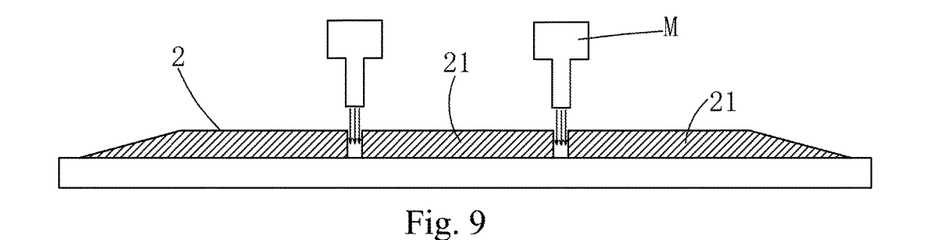
FIG. 9 is a schematic cross-sectional view corresponding to A-A in FIG. 8.
Figure 10:
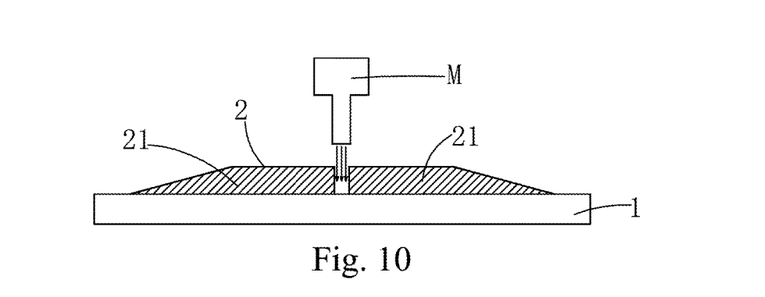
FIG. 10 is a schematic cross-sectional view corresponding to B-B in FIG. 8.

Step S3, referring to FIG. 8 to FIG. 10, cutting the entire surface of the ITO film 2 using a laser cutting (a laser cutting path is indicated by a chain double-dashed line in FIG. 8), and the entire surface of the ITO film 2 is divided into multiple ITO blocks 21.

Specifically, the laser light is an infrared (IR) laser light generated by a laser cutter M, and a wavelength band is preferably 106 nm to 780 nm.

As shown in FIG. 8, a shape of the ITO block 21 is preferably a regular rectangle.

It is worth noting that when performing a laser cutting, the thinner the ITO film thickness is, the weaker the absorption of the laser energy is. Accordingly, when the film thickness is thinner, the surface temperature of the ITO film is lower. The uneven film thickness portion at the peripheral edge portion of the entire surface of the ITO film 2 cannot be cut by the laser. Accordingly, after the step S3 is performed, there is actually a connection between the respective ITO blocks 21 at the dotted line frame illustrated in FIG. 8, so that the insulation between the respective ITO blocks 21 is poor.

Figure 11:
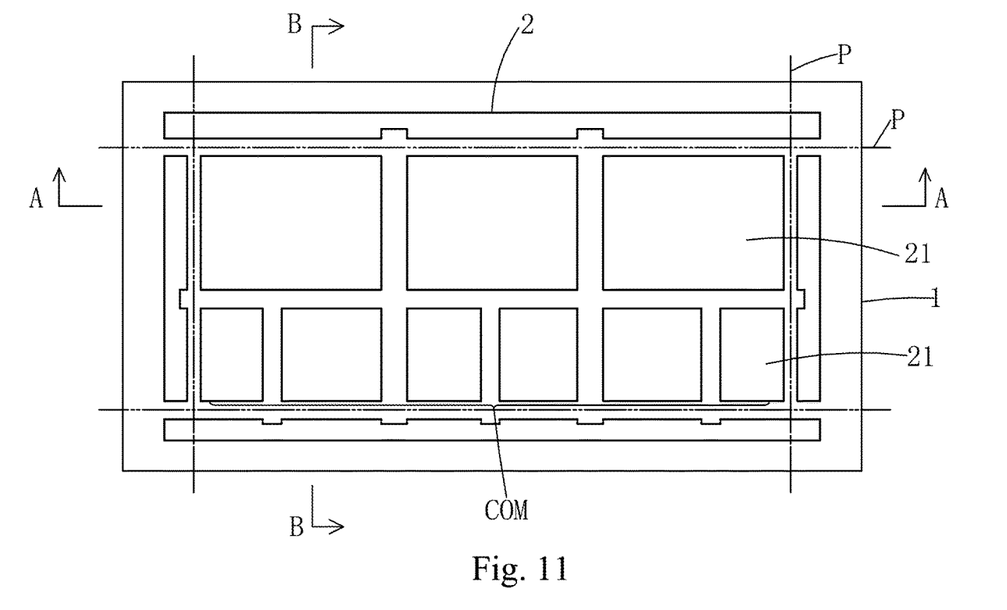
FIG. 11 is a schematic plan view of a step S3 of the manufacturing method for ITO common electrode on CF substrate side according to the present invention.
Figure 12:
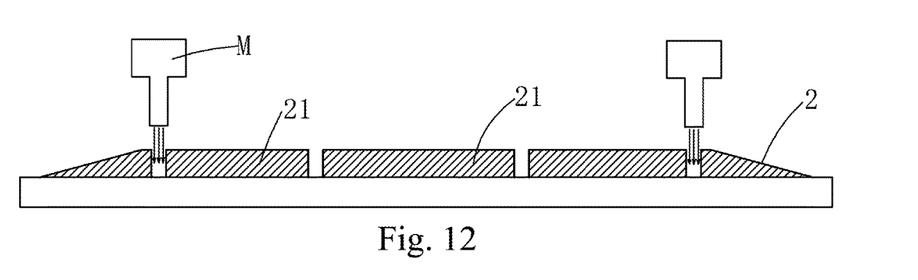
FIG. 12 is a schematic cross-sectional view corresponding to A-A in FIG. 11.
Figure 13:
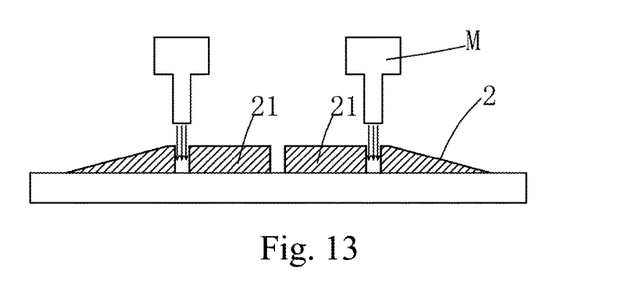
FIG. 13 is a schematic cross-sectional view corresponding to B-B in FIG. 11.

Step S4, referring to FIG. 11 to FIG. 13, performing a laser cutting again along the uniform film thickness portion at the peripheral edge portion of the entire surface of the ITO film 2 such that a laser cutting path P (indicated by a chain double-dashed line in FIG. 11) at the uniform film thickness portion at the peripheral edge portion of the entire surface of the ITO film 2 form a closed pattern.

By performing this step S4, the connection of each ITO blocks 21 at the uneven film thickness portion at the peripheral edge portion of the entire surface of the ITO film 2 can be completely cut off, and the multiple ITO blocks 21 located in the closed pattern form an ITO common electrode COM of CF substrate side such that the insulation between the multiple ITO blocks 21 is improved (experimentally verified, the impedance between any two ITO blocks 21 can reach 20 MO or more) so as to ensure that different ITO blocks 21 can independently access different Curing signals without affecting each other.

Specifically, the laser light used in the step S4 is still an IR laser generated by the laser cutter M, and the wavelength band is preferably 106 nm to 780 nm.

The closed pattern formed by the laser cutting path P at the uniform film thickness portion at the peripheral edge portion of the entire surface of the ITO film 2 is preferably rectangular.

In summary, the manufacturing method for ITO common electrode on CF substrate side of the present invention, after diving the entire surface of the ITO film into multiple ITO blocks, performing a laser cutting again along the uniform film thickness portion at the periphery of the entire surface of the ITO film, and a laser cutting path at the uniform film thickness portion at the periphery of the entire surface of the ITO film form a closed pattern such that the connection of each ITO block at the uneven thickness portion of the periphery of the entire surface of the ITO film can be completely cut off, and the multiple ITO blocks located in the closed pattern constitute the ITO common electrode on the CF substrate side, thereby the insulation between the multiple ITO blocks is improved, ensuring that different ITO blocks can independently inputted with different Curing signals without affecting each other.

In the above, various other corresponding changes and modifications can be made according to the technical solutions and technical ideas of the present invention to those skilled in the art. All such changes and modifications are intended to be included within the scope of the appended claims.

What is claimed is:

1. A manufacturing method for ITO common electrode on CF substrate side, comprising steps of:
   step S1, providing a CF substrate;
   step S2, forming a continuous uninterrupted entire surface of ITO film on the CF substrate, wherein a peripheral edge portion of the entire surface of the ITO film includes a uniform film thickness portion and an uneven film thickness portion around a periphery of the uniform film thickness portion, the film thickness of the entire surface of the ITO film is uniform except for the peripheral edge portion;

step S3, cutting the entire surface of the ITO film using a laser cutting, and the entire surface of the ITO film is divided into multiple ITO block; and step S4, performing the laser cutting again along the uniform film thickness portion at the peripheral edge portion of the entire surface of the ITO film such that a laser cutting path at the uniform film thickness portion at the peripheral edge portion of the entire surface of the ITO film form a closed pattern; and multiple ITO blocks located in the closed pattern form an ITO common electrode of a side of the CF substrate.

2. The manufacturing method for ITO common electrode on CF substrate side according to claim 1, wherein in the step S2, a physical vapor deposition process is adopted to form the entire surface of the ITO film.

3. The manufacturing method for ITO common electrode on CF substrate side according to claim 2, wherein a film thickness of the entire surface of ITO film is 100 nm~150 nm.

4. The manufacturing method for ITO common electrode on CF substrate side according to claim 1, wherein a laser light adopted is an infrared laser light.

5. The manufacturing method for ITO common electrode on CF substrate side according to claim 4, wherein a wavelength band of the infrared laser light is 106 nm~780 nm.

6. The manufacturing method for ITO common electrode on CF substrate side according to claim 1, wherein a shape of the ITO block is a rectangle.

7. The manufacturing method for ITO common electrode on CF substrate side according to claim 1, wherein a closed pattern formed by the laser cutting path at the uniform film thickness portion at the peripheral edge portion of the entire surface of the ITO film is rectangular.

8. The manufacturing method for ITO common electrode on CF substrate side according to claim 4, wherein the infrared laser is generated by a laser cutter.

9. The manufacturing method for ITO common electrode on CF substrate side according to claim 1, wherein different ITO blocks independently input with different electric signal.

* * * * *